United States Patent
Wu et al.

(10) Patent No.: US 8,769,694 B2
(45) Date of Patent: Jul. 1, 2014

(54) PROXY GATEWAY ANTI-VIRUS METHOD, PRE-CLASSIFIER, AND PROXY GATEWAY

(71) Applicant: Huawei Technologies Co., Ltd., Shenzhen (CN)

(72) Inventors: Hao Wu, Hangzhou (CN); Mian Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/707,016

(22) Filed: Dec. 6, 2012

(65) Prior Publication Data

US 2013/0097666 A1    Apr. 18, 2013

Related U.S. Application Data

(63) Continuation of application No. PCT/CN2011/072847, filed on Apr. 15, 2011.

(30) Foreign Application Priority Data

Jul. 13, 2010    (CN) .......................... 2010 1 0228197

(51) Int. Cl.
    *G06F 11/00*    (2006.01)
(52) U.S. Cl.
    USPC ................................................ 726/24; 726/1
(58) Field of Classification Search
    USPC .................................. 726/1, 22, 24; 713/188
    See application file for complete search history.

(56) References Cited

U.S. PATENT DOCUMENTS

| | | | | |
|---|---|---|---|---|
| 7,263,616 | B1 * | 8/2007 | Brackett | 713/188 |
| 7,290,282 | B1 * | 10/2007 | Renert et al. | 726/24 |
| 7,712,136 | B2 * | 5/2010 | Sprosts et al. | 726/24 |

(Continued)

FOREIGN PATENT DOCUMENTS

| | | |
|---|---|---|
| CN | 101141453 | 3/2008 |
| CN | 101150583 | 3/2008 |

(Continued)

OTHER PUBLICATIONS

International Search Report of PCT/CN2011/072847 mailed Jul. 7, 2011.

(Continued)

*Primary Examiner* — Samson Lemma
(74) *Attorney, Agent, or Firm* — Staas & Halsey LLP

(57) ABSTRACT

The present invention discloses a proxy gateway anti-virus method, a pre-classifier, and a proxy gateway. The method includes: receiving a resource obtaining request for obtaining a to-be-transmitted resource; sending a pre-detection request to a network element that stores the to-be-transmitted resource, to obtain attribute information of the to-be-transmitted resource; judging, based on an anti-virus policy and according to the attribute information, whether the to-be-transmitted resource needs anti-virus scanning; if yes, performing anti-virus scanning on the to-be-transmitted resource that is subsequently obtained; and if no, transparently transmitting the to-be-transmitted resource that is subsequently obtained. The present invention provides a technical solution to pre-detecting whether a to-be-transmitted resource needs anti-virus scanning according to attribute information, and a resource that needs no anti-virus scanning can be transmitted transparently and directly before the resource is sent to a proxy layer, thereby implementing an anti-virus function, improving transmission efficiency, and reducing the waste of resources.

15 Claims, 5 Drawing Sheets

(56) References Cited

U.S. PATENT DOCUMENTS

| | | | |
|---|---|---|---|
| 7,865,965 B2* | 1/2011 | Kramer et al. | 726/30 |
| 2003/0145228 A1* | 7/2003 | Suuronen et al. | 713/201 |
| 2005/0235352 A1 | 10/2005 | Staats et al. | |
| 2007/0079379 A1* | 4/2007 | Sprosts et al. | 726/24 |
| 2007/0220607 A1* | 9/2007 | Sprosts et al. | 726/24 |
| 2008/0313733 A1* | 12/2008 | Kramer et al. | 726/22 |
| 2009/0307776 A1* | 12/2009 | Curnyn | 726/24 |

FOREIGN PATENT DOCUMENTS

| | | |
|---|---|---|
| CN | 101599922 | 12/2009 |
| CN | 101877710 | 11/2010 |
| CN | 201010228197.6 | 10/2012 |
| WO | 2006/034201 | 3/2006 |

OTHER PUBLICATIONS

International Search Report mailed Jul. 7, 2011 in corresponding International Patent Application No. PCT/CN2011/072847.

Chinese Office Action mailed May 25, 2012 in corresponding Chinese Application No. 201010228197.6 (3 pages) (6 pages English Translation).

Notice of Allowance mailed Aug. 6, 2012 in corresponding Chinese Application No. 201010228197.6 (1 page) (2 pages English Translation).

* cited by examiner

PROXY GATEWAY ANTI-VIRUS METHOD, PRE-CLASSIFIER, AND PROXY GATEWAY

CROSS-REFERENCE TO RELATED APPLICATIONS

This application is a continuation of International Application No. PCT/CN2011/072847, filed on Apr. 15, 2011, which claims priority to Chinese Patent Application No. 201010228197.6, filed on Jul. 13, 2010, both of which are hereby incorporated by reference in their entireties.

FIELD OF THE INVENTION

The embodiments of the present invention relate to network anti-virus technologies, and in particular, to a proxy gateway anti-virus method, a pre-classifier, and a proxy gateway.

BACKGROUND OF THE INVENTION

As an important part of a unified threat management (Unified Threat Management, UTM for short) function, an anti-virus (Anti-Virus, AV for short) technology attracts more and more attention. Its merits are to block malicious software on a gateway side, intercept a threat practically before an attack occurs, and protect user security to a greater extent.

Currently, a gateway that has an anti-virus function is implemented in two manners, that is, a proxy-based anti-virus gateway (which may be referred to as a proxy-type anti-virus gateway, and may also be referred to as a proxy gateway) and a stream scanning-based anti-virus gateway. The proxy anti-virus gateway starts proxy during three-way handshaking. The proxy gateway includes a proxy server and a proxy client, respectively interacting with a client (hereinafter referred to as a physical client to avoid confusion with the proxy client in the proxy gateway), and interacting with a server (hereinafter referred to as a physical server to avoid confusion with the proxy server in the proxy gateway). In an interactive communication process, a virus-scanning and caching module (Cache & Scanner) is responsible for receiving and caching a file. After the file is received, the file is sent to a scanning engine for virus scanning and identifying. If the file has no virus threat, the file is sent to the physical client or the physical server. The physical client and the physical server are generally unaware of a true identity of a peer end that performs data interaction with them.

During research on the present invention, the inventor finds that the prior art has the following defects: The proxy gateway needs to send each of received data packets to a proxy layer, and the virus-scanning and caching module caches the data packet first; for a data packet that needs scanning, the virus-scanning and caching module sends the data packet to the scanning engine for anti-virus scanning; if it is found that the data packet is not a file that is set by a user for scanning or is an unscannable file, the data packet also needs to be transparently transmitted through the proxy layer. In the foregoing implementation manner, excessive proxy layer resources are occupied, in which makes transmission efficiency extremely low, thereby greatly reducing gateway performance, and degrading user experience.

SUMMARY OF THE INVENTION

Embodiments of the present invention provide a proxy gateway anti-virus method, a pre-classifier, and a proxy gateway to improve transmission efficiency of a proxy gateway and reduce resource waste.

An embodiment of the present invention provides a proxy gateway anti-virus method, including:

receiving a resource obtaining request for obtaining a to-be-transmitted resource;

sending, according to the resource obtaining request, a pre-detection request to a network element that stores the to-be-transmitted resource, to obtain attribute information of the to-be-transmitted resource; and judging, based on an anti-virus policy and according to the attribute information, whether the to-be-transmitted resource needs anti-virus scanning; if yes, performing anti-virus scanning on the to-be-transmitted resource that is subsequently obtained; and if no, transparently transmitting the to-be-transmitted resource that is subsequently obtained.

An embodiment of the present invention further provides a pre-classifier, including:

a detecting and obtaining module, configured to receive a resource obtaining request for obtaining a to-be-transmitted resource, and send, according to the resource obtaining request, a pre-detection request to a network element that stores the to-be-transmitted resource;

an attribute obtaining module, configured to receive attribute information of the to-be-transmitted resource, where the attribute information of the to-be-transmitted resource is returned by the network element;

a policy judging module, configured to judge, based on an anti-virus policy and according to the attribute information, whether the to-be-transmitted resource needs anti-virus scanning;

a scan initiating module, configured to, if the policy judging module judges that anti-virus scanning is needed, perform anti-virus scanning on the to-be-transmitted resource that is subsequently obtained; and a transparent transmission initiating module, configured to, if the policy judging module judges that no anti-virus scanning is needed, transparently transmit the to-be-transmitted resource that is subsequently obtained.

An embodiment of the present invention further provides a proxy gateway, including a proxy client, a proxy server, and a virus-scanning and caching module, and further includes the pre-classifier provided in the embodiment of the present invention, where the pre-classifier is disposed at a lower layer of the proxy client and the proxy server.

The embodiments of the present invention provide a technical solution to pre-detecting whether a to-be-transmitted resource needs anti-virus scanning. The to-be-transmitted resource is pre-detected according to attribute information, and a resource that needs no anti-virus scanning can be transmitted transparently and directly, thereby implementing an anti-virus function, improving transmission efficiency, and reducing the waste of cache, scanning, and upper-layer transmission resources.

BRIEF DESCRIPTION OF THE DRAWINGS

To illustrate the technical solutions in the embodiments of the present invention more clearly, the accompanying drawings required for describing the embodiments are introduced briefly in the following. Apparently, the accompanying drawings in the following description merely show some embodiments of the present invention, and persons of ordinary skill in the art may also derive other drawings from these accompanying drawings without creative efforts.

DETAILED DESCRIPTION OF THE EMBODIMENTS

To make the objectives, technical solutions, and advantages of the present invention more comprehensible, the technical solutions in the embodiments of the present invention are described clearly and completely in the following with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
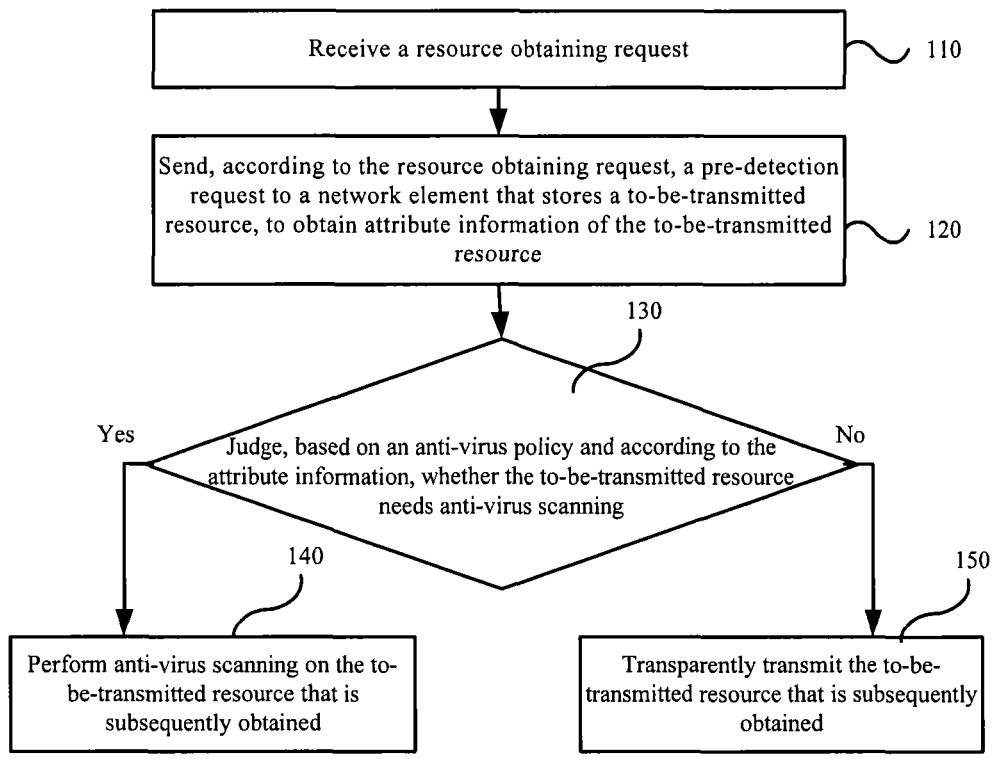
FIG. 1 is a flowchart of a proxy gateway anti-virus method according to Embodiment 1 of the present invention.

FIG. 1 is a flowchart of a proxy gateway anti-virus method according to Embodiment 1 of the present invention. The method may be executed by a pre-classifier that is disposed in a proxy gateway. The pre-classifier may be a hardware device added in the proxy gateway or may be an integrated software module, and is configured to pre-detect whether a to-be-transmitted resource needs anti-virus scanning and then perform classification according to whether scanning is needed. The pre-classifier executes the following procedure:

Step 110: Receive a resource obtaining request.

Specifically, the pre-classifier may intercept a received resource obtaining request in the proxy gateway.

Step 120: Send, according to the resource obtaining request, a pre-detection request to a network element that stores a to-be-transmitted resource, to obtain attribute information of the to-be-transmitted resource.

In this step, specifically, the pre-classifier detects and obtains the attribute information of the to-be-transmitted resource actively, and the resource obtaining request is generally from a physical client and is a download request for downloading a resource from the physical server or an upload request for uploading a resource to the physical server, and obviously, in a specific application, the resource obtaining request may be from a physical server and is a request for transmitting data. Or, in summary, among network elements under proxy of the proxy gateway, if one network element requests a to-be-transmitted resource from another network element, the proxy gateway intercepts the resource obtaining request, and constructs and sends a pre-detection request, to request for obtaining attribute information of the to-be-transmitted resource.

Step 130: Judge, based on an anti-virus policy and according to the attribute information, whether the to-be-transmitted resource needs anti-virus scanning. If yes, step 140 is performed; and if no, step 150 is performed.

Specifically, the anti-virus policy may be set as required with reference to the attribute information. For example, the attribute information may be a file type, size and file name of the to-be-transmitted resource, and therefore, in a corresponding anti-virus policy, it may be set that which type of resource needs scanning or a resource whose size is greater than a threshold needs scanning.

In addition, in step 130, a judgment operation may be implemented in different manners. For example, it may be that the pre-classifier judges, based on a locally stored anti-virus policy and according to the attribute information, whether the to-be-transmitted resource needs anti-virus scanning, that is, the judgment operation is completely implemented in the pre-classifier; or, it may also be that the pre-classifier sends the attribute information to an external server to instruct the external server to judge, based on the anti-virus policy and according to the attribute information, whether the to-be-transmitted resource needs anti-virus scanning, and return a judgment result. The pre-classifier obtains the judgment result and determines which to-be-transmitted resources need anti-virus scanning.

Step 140: Perform anti-virus scanning on the to-be-transmitted resource that is subsequently obtained.

In this step, the pre-classifier may send a to-be-transmitted resource stream that is subsequently obtained to a corresponding module at a proxy layer to perform file caching and anti-virus scanning. A scanned to-be-transmitted resource may be processed differently according to a set processing policy. For example, when the physical client sends a download request, in one circumstance, the scanned to-be-transmitted resource may further be transmitted to the physical client; and in another circumstance, a download file may be discarded due to a virus, to prompt the physical client that downloading fails.

Step 150: Transparently transmit the to-be-transmitted resource that is subsequently obtained.

In this step, the pre-classifier may transparently transmit the to-be-transmitted resource stream to the physical client or physical server directly, and does not need to send the to-be-transmitted resource stream to the corresponding module at the proxy layer for processing.

This embodiment provides a technical solution to pre-detecting whether a to-be-transmitted resource needs anti-virus scanning. In the prior art, when anti-virus scanning is implemented at a proxy gateway, a to-be-scanned file generally needs to be uploaded to a proxy layer for caching, and then anti-virus scanning is performed on a cached file. Therefore, processes of caching and anti-virus scanning occupy many upper-layer resources and cache spaces, for example, occupy many memory resources. According to the technical solution in this embodiment, a pre-classifier pre-detects a resource actively at a resource request obtaining stage; subsequently, the to-be-transmitted resource is pre-detected according to attribute information; and the to-be-transmitted resource that needs no anti-virus scanning can be transmitted transparently and directly, thereby implementing an anti-virus function, improving transmission efficiency, and reducing the waste of cache, scanning and upper-layer transmission resources.

In the prior art, after a to-be-transmitted resource (file) is received, the file is generally uploaded to a proxy layer for caching, and then anti-virus scanning is performed on a cached file. Therefore, processes of caching and anti-virus scanning occupy many upper-layer resources and cache spaces, for example, occupy many memory resources. According to the technical solution in this embodiment, a pre-classifier pre-detects a resource actively at a resource request obtaining stage; and the to-be-transmitted resource is pre-detected according to attribute information of a resource requested by a resource obtaining request (that is, the to-be-transmitted resource). In this way, after to-be-transmitted resources are received subsequently, a resource that needs no anti-virus scanning can be transmitted transparently and directly, and does not need to be sent to a proxy layer for caching and anti-virus scanning, thereby implementing an anti-virus function, improving transmission efficiency, and reducing the waste of cache, scanning and upper-layer transmission resources.

Figure 2:
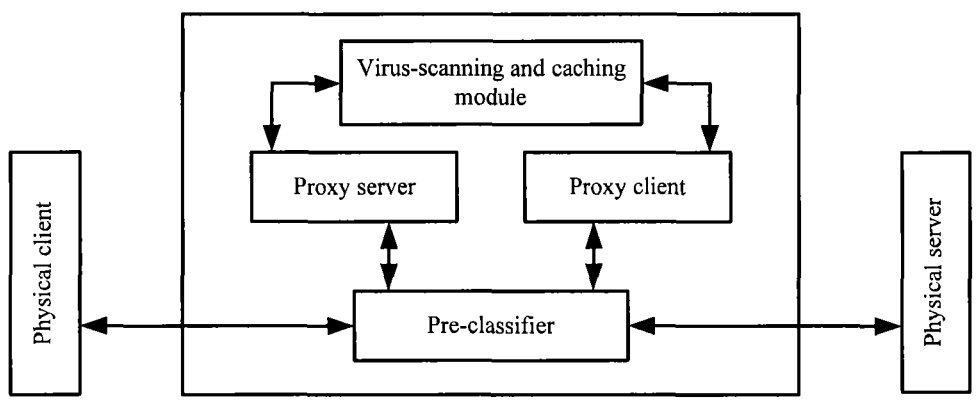
FIG. 2 is a schematic diagram of a network architecture applied to Embodiment 1 of the present invention.

The technical solution in this embodiment is applicable to a network architecture shown in FIG. 2. A pre-classifier is added in a proxy gateway, and the pre-classifier is connected to an upper-layer proxy server and proxy client respectively and is further connected to a physical server and a physical client at an operating system layer. That is, the pre-classifier is installed between a lower-layer packet receiving module and an upper proxy layer. Before the physical client needs to upload a file to the physical server or download a file from the physical server, the pre-classifier may intercept an upload request or a download request of the physical client first, actively detect and obtain attribute information of a to-be-transmitted file that needs to be uploaded or downloaded by the physical client, judge the to-be-transmitted file, and according to a judgment result, transmit a file that needs scanning to the proxy server or the proxy client, and then provide the file for a virus-scanning and caching module for anti-virus scanning, and transparently and directly transmit a file that needs no scanning to a destination end (the physical server or the physical client), so that a workload of the upper proxy layer can be reduced.

Figure 3:
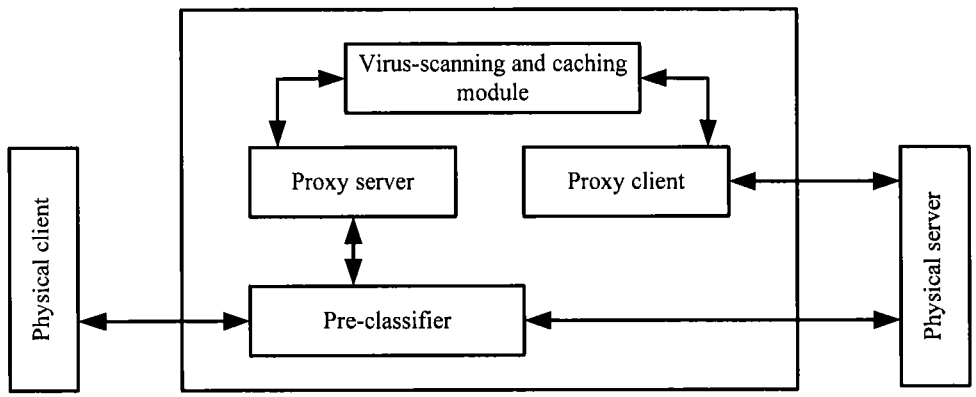
FIG. 3 is a schematic diagram of another network architecture applied to Embodiment 1 of the present invention.

The technical solution in this embodiment is also applicable to a network architecture shown in FIG. 3. In a practical application, typical anti-virus protection is primarily directed to anti-virus scanning for a file that is transmitted to a client, and, in most circumstances, a physical client sends a resource obtaining request to a physical server. In a proxy gateway shown in FIG. 3, a pre-classifier is connected to a proxy server. When it is judged that a to-be-transmitted resource requested by a physical client needs scanning, the to-be-transmitted resource received subsequently is provided through the proxy server for a virus-scanning and caching module for anti-virus scanning.

Embodiment 2

Figure 4:
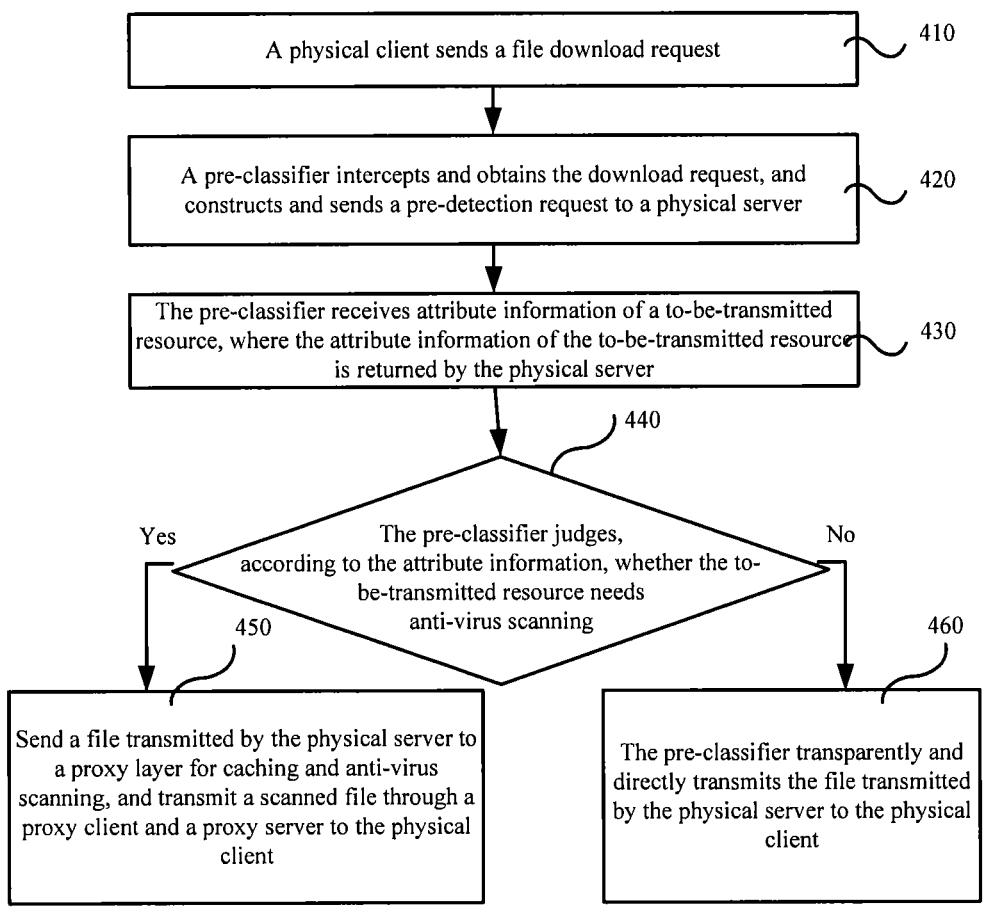
FIG. 4 is a flowchart of a proxy gateway anti-virus method according to Embodiment 2 of the present invention.

FIG. 4 is a flowchart of a proxy gateway anti-virus method according to Embodiment 2 of the present invention. This embodiment is specifically a scenario where a physical client downloads a file from a physical server, and includes the following steps:

Step 410: A physical client sends a file download request, that is, a resource obtaining request.

Step 420: A pre-classifier intercepts and obtains the download request, and constructs and sends a pre-detection request to a physical server.

Step 430: The pre-classifier receives attribute information of a to-be-transmitted resource, where the attribute information of the to-be-transmitted resource is returned by the physical server.

Step 440: The pre-classifier judges, according to the attribute information, whether the to-be-transmitted resource needs anti-virus scanning. If yes, step 450 is performed; and if no, step 460 is performed.

Step 450: After sending the file download request to the physical server, the pre-classifier sends a file transmitted by the physical server to a proxy layer for caching and anti-virus scanning. Afterward, a scanned file may be processed in a conventional processing way. Generally, the scanned file is transmitted to the physical client through a proxy client and a proxy server.

Step 460: The pre-classifier directly and transparently transmits the file transmitted by the physical server to the physical client.

According to the technical solution in this embodiment, a resource is pre-detected actively at a download request stage; subsequently, a to-be-transmitted resource is pre-detected according to attribute information; and the to-be-transmitted resource that needs no anti-virus scanning can be transmitted transparently and directly, thereby implementing an anti-virus function, improving transmission efficiency, and reducing the waste of cache, scanning, and upper-layer transmission resources.

Embodiment 3

Figure 5:
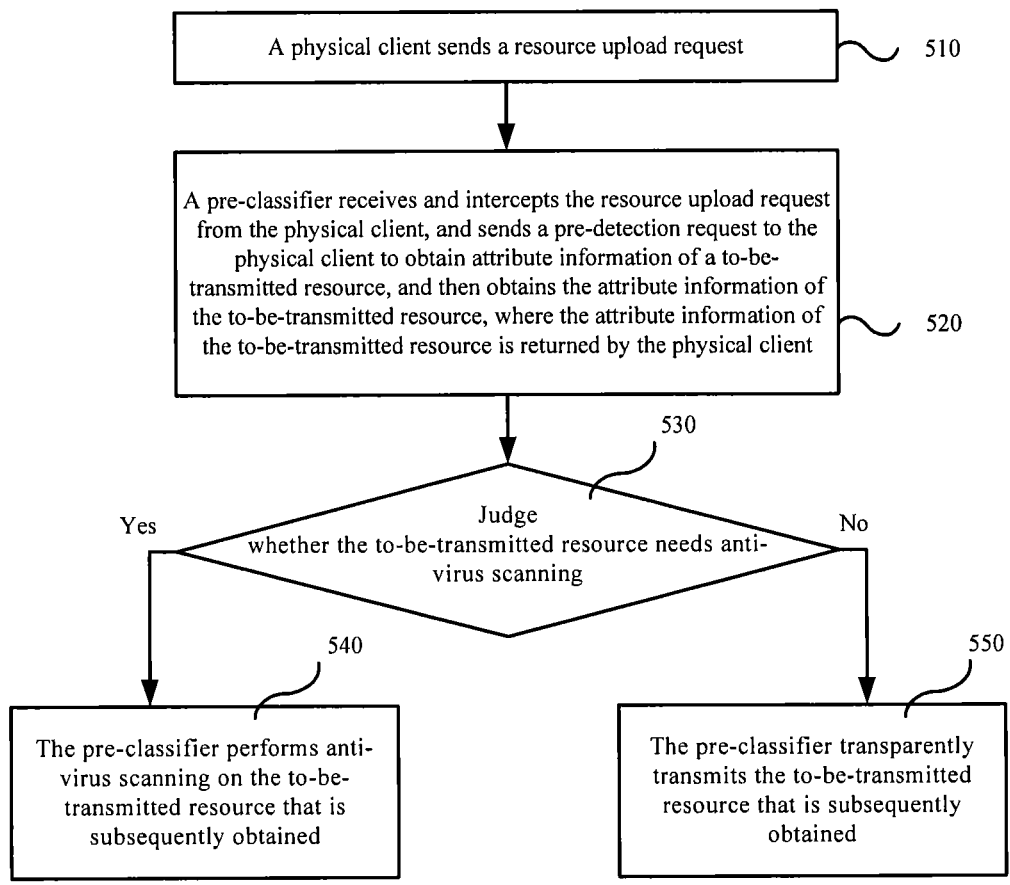
FIG. 5 is a flowchart of a proxy gateway anti-virus method according to Embodiment 3 of the present invention.

FIG. 5 is a flowchart of a proxy gateway anti-virus method according to Embodiment 3 of the present invention. Being similar to Embodiment 2, this embodiment is a scenario where a physical client uploads a file to a physical server, and specifically includes the following steps:

Step 510: A physical client sends a file upload request, that is, a resource upload request.

Step 520: A pre-classifier receives and intercepts the resource upload request from the physical client, and sends a pre-detection request to the physical client to obtain attribute information of a to-be-transmitted resource, and then obtains the attribute information of the to-be-transmitted resource, where the attribute information of the to-be-transmitted resource is returned by the physical client.

Step 530: The pre-classifier judges, based on an anti-virus policy and according to the attribute information, whether the to-be-transmitted resource needs anti-virus scanning. If yes, step 540 is performed; and if no, step 550 is performed.

Step 540: The pre-classifier sends the to-be-transmitted resource that is subsequently obtained to a proxy layer for anti-virus scanning.

In this step, specifically, the to-be-transmitted resource that is subsequently obtained may be sent to a corresponding module at the proxy layer to perform file caching and anti-virus scanning. A scanned to-be-transmitted resource may be processed differently according to a set processing policy. For example, in one circumstance, a scanned resource may further be transmitted to the physical client; and in another circumstance, a file may be discarded due to a virus, to prompt the physical client that file uploading fails. This upload procedure is ended.

Step 550: The pre-classifier transparently transmits the to-be-transmitted resource that is subsequently obtained.

According to the technical solution in this embodiment, a resource is pre-detected actively at an upload request stage; subsequently, a to-be-transmitted resource is pre-detected according to attribute information; and a to-be-transmitted resource that needs no anti-virus scanning can be transmitted transparently and directly, thereby implementing an anti-virus function, improving transmission efficiency, and reducing the waste of cache, scanning, and upper-layer transmission resources.

Embodiment 4

Figure 6:
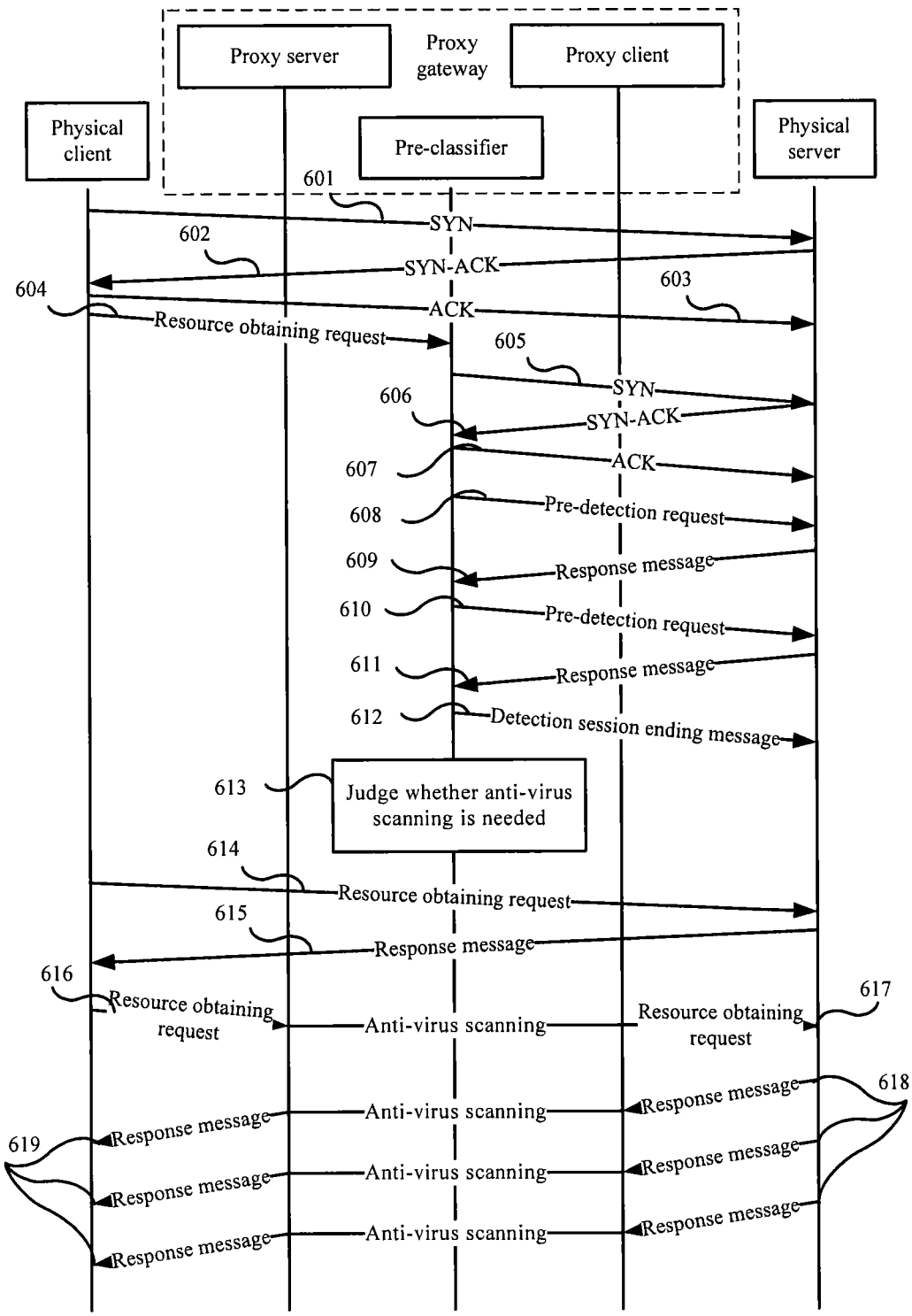
FIG. 6 is a signaling flowchart of a proxy gateway anti-virus method according to Embodiment 4 of the present invention.

FIG. 6 is a signaling flowchart of a proxy gateway anti-virus method according to Embodiment 4 of the present invention. Based on Embodiment 2, this embodiment may be described by taking a case that a data packet is transmitted based on a hypertext transfer protocol (Hypertext Transfer Protocol, HTTP for short) as an example. The proxy gateway anti-virus method provided in this embodiment may include the following steps:

Step 601: A physical client sends an SYN message to a physical server through a proxy server and a proxy client of a proxy gateway.

Step 602: The physical server returns an SYN-ACK message to the physical client through the proxy gateway.

Step 603: The physical client returns an ACK message to the physical server through the proxy gateway.

In steps 601 to 603, handshaking between the physical client and the physical server is implemented through the proxy gateway. Forwarding details of the proxy gateway in this process are not described here.

Step 604: The proxy gateway receives a resource obtaining request (HTTP GET Request) sent by the physical client, and a pre-classifier intercepts the resource obtaining request.

Steps 605 to 607 are similar to steps 601 to 603. A handshake interaction (an SYN, SYN-ACK, and ACK message interaction) between the pre-classifier and the physical server is performed, and a new connection is initiated to the physical server, thereby preparing for sending a pre-detection request. A new connection is established through handshaking between the pre-classifier and the physical server to avoid interference with an established connection channel of a to-be-transmitted resource.

Step 608: The pre-classifier constructs and sends a pre-detection request to the physical server.

In this embodiment, the pre-detection request is specifically an HTTP HEAD request, and the HTTP HEAD request is sent to the physical server to request for obtaining a file size of a to-be-transmitted resource and use the file size as attribute information.

Step 609: The physical server returns a corresponding response message to the pre-classifier according to the HTTP HEAD request.

Specifically, the response message in this embodiment is an HTTP Response that carries information indicating the file size of the to-be-transmitted resource.

Step 610: The pre-classifier sends a resource obtaining request setting with a range field (RANGE) (HTTP GET with RANGE Field) to the physical server and uses the resource obtaining request as a pre-detection request.

The range field is used to indicate that a byte in a set range in the to-be-transmitted resource is obtained, and information carried in the byte in the set range is used as attribute information.

In a practical application, it may be set that the first 64 bytes of the to-be-transmitted resource are obtained. Generally, the first 64 bytes of a file correspond to a file type of a to-be-obtained file. For HTTP protocol-based file transmission, an HTTP GET with RANGE Field request may be constructed to obtain relevant information of a to-be-transmitted file.

Step 611: According to the HTTP GET with RANGE Field request, the physical server returns a corresponding response message, that is, an HTTP Response, to the pre-classifier. The response message carries information of the byte in the set range.

Either the HTTP HEAD request or the resource obtaining request setting with a "Range" field (HTTP GET with RANGE Field) may be used as a pre-detection request. A user-defined message may be used as a pre-detection request to obtain required attribute information, or an existing message in an HTTP protocol may be used to obtain required attribute information for one or more times.

It should be noted that steps 608 to 609 and steps 610 to 611 in the foregoing are two manners for obtaining attribute information. In a practical application, both or either of the two manners may be adopted. The order of executing the two manners for obtaining attribute information is not limited.

Step 612: The pre-classifier sends a detection session ending message, which is specifically a RESET message, to the physical server.

Step 613: The pre-classifier judges, based on an anti-virus policy and according to the attribute information, whether the to-be-transmitted resource needs anti-virus scanning. If no, step 614 is performed; and if yes, step 616 is performed.

Step 614: In an operating system layer, the pre-classifier transparently and directly transmits the resource obtaining request to the physical server, without transmitting the resource obtaining request to a proxy layer or performing anti-virus scanning on the resource obtaining request, where the resource obtaining request is sent by the physical client. Proceed to step 615.

Specifically, one manner for implementing transparent transmission may be to set a transmission control protocol (Transmission Control Protocol, TCP for short) stream as a flag indicating that AV scanning is not needed. Subsequently, all packets of this data stream are transparently and directly transmitted by a packet receiving module to a destination, that is, the physical client or the physical server, without being sent to the proxy layer.

Step 615: In the operating system layer, the pre-classifier transparently and directly transmits the response (HTTP Response), that is, a data stream of the to-be-transmitted resource, to the physical client, without transmitting the response to the proxy layer or performing anti-virus scanning on the response, where the response is returned by the physical server.

The resource obtaining request and a subsequently transmitted resource are transmitted in the same created data stream. The data stream may be identified by a quintuple, such as a destination address of the data stream, and a destination port of the data stream.

Step 616: In the operating system layer, the pre-classifier provides, through the proxy server, the resource obtaining request sent by the physical client, for a virus-scanning and caching module to perform anti-virus scanning. Proceed to step 617.

Step 617: The scanned resource obtaining request is sent through the proxy client to the physical server. Proceed to step 618.

Step 618: The physical server returns a response (HTTP Response) to the proxy client. In this way, the data stream of the to-be-transmitted resource is provided for the virus-scanning and caching module to perform anti-virus scanning. Proceed to step 619.

Step 619: The proxy server sends a scanned resource to the physical client.

A stream of each to-be-transmitted resource may include multiple data packets. Therefore, the response may be returned multiple times to transmit the data packets separately. In this case, step 618 and step 619 may be performed multiple times.

In this embodiment, the pre-classifier may transmit the to-be-transmitted resource that is subsequently obtained to the proxy layer for caching and anti-virus scanning. The attribute information used for judging whether scanning is needed includes but is not limited to: a file size, a file type, a file name, and/or a file author, and so on. Generally, for an existing HTTP data packet, a file type is known as long as the first 64 bytes of the to-be-transmitted resource are obtained.

A specific anti-virus policy may be set as required. For example, the following manners may be applied to judge, based on the anti-virus policy and according to the attribute information, whether the to-be-transmitted resource needs anti-virus scanning:

In one circumstance, it may be judged, according to the file size in the attribute information, whether a size of the to-be-transmitted resource is greater than a set threshold, to determine whether anti-virus scanning is needed. Specifically, because a cache space of the proxy gateway is generally limited, an over-sized file that cannot be cached or scanned can be transmitted transparently and directly.

In another circumstance, it may be judged, according to the file type in the attribute information, whether a type of the to-be-transmitted resource belongs to a set type, to determine whether the to-be-transmitted resource needs anti-virus scanning. Which type of files need scanning may be set by a user. For example, document types such as *.txt, and *.doc may be set as types that need no scanning.

In addition, it may also be judged, according to a file name (or file author) in the attribution information, a file name (or file author) of the to-be-transmitted resource matches a set field (such as a keyword), to determine whether anti-virus scanning is needed. Specifically, when the file name or file author of the to-be-transmitted resource matches the set field, it is determined that anti-virus scanning is needed; or, when the file name or file author of the to-be-transmitted resource does not match the set field, it is determined that no anti-virus scanning is needed and transparent transmission is performed directly. For example:

If a file name of a file includes "free of charge", the file needs anti-virus scanning;
if a file author of a file is null, the file needs anti-virus scanning; and
if a file author of a file is "Microsoft" or another author that is considered to be trustable, the file needs no anti-virus scanning.

It should be noted that the attribute information of the to-be-transmitted resource and specific content of the anti-virus policy include but are not limited to the types described in the foregoing. For example, A hash operation may also be performed by detecting the first several bytes, the several middle bytes, or the last several bytes of the to-be-transmitted resource; and a result of the operation is matched with a matching table to judge whether the to-be-transmitted resource needs scanning.

In addition, it should further be noted that a virus scanning manner in the embodiment of the present invention is not limited to performing anti-virus scanning in a local virus-scanning and caching module of the proxy gateway; and the to-be-transmitted resource that is subsequently obtained may also be sent to an anti-virus server for anti-virus scanning.

The foregoing technical solution is not limited to an HTTP protocol, and may also be applied to multiple network protocols, and messages that have been specified in various protocols may be used to pre-detect the attribute information. For example, for a file transfer protocol (File Transfer Protocol, FTP for short), a SIZE request may be sent to request for obtaining the file size of the to-be-transmitted resource.

According to the technical solution in this embodiment, a to-be-transmitted resource is pre-detected to identify whether anti-virus scanning is needed, and a majority of traffic that needs no anti-virus scanning is transmitted transparently and directly. In this way, resource pressure of the proxy gateway is relieved, and transmission performance of an anti-virus proxy gateway is ensured in the case that security is not impaired, and user experience of accessing a network is improved.

Embodiment 5

Figure 7:
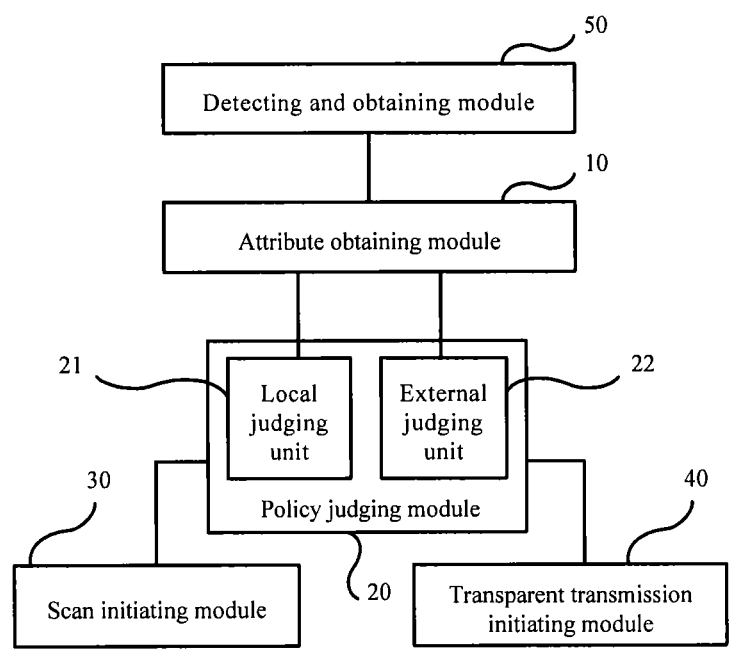
FIG. 7 is a schematic structural diagram of a pre-classifier according to Embodiment 5 of the present invention.

FIG. 7 is a schematic structural diagram of a pre-classifier according to Embodiment 5 of the present invention. The pre-classifier includes: a detecting and obtaining module 50, an attribute obtaining module 10, a policy judging module 20, a scan initiating module 30, and a transparent transmission initiating module 40.

The detecting and obtaining module 50 is configured to receive a resource obtaining request, and send, according to the resource obtaining request, a pre-detection request to a network element that stores a to-be-transmitted resource.

Specifically, the resource obtaining request may be a download request or an upload request from a physical client, and may also be a relevant request sent by a physical server to the physical client to obtain a resource. During resource transmission based on different protocols, a message that has been specified in a protocol may be used as a pre-detection request. For example, when the to-be-transmitted resource includes a hypertext transfer protocol-based file, the pre-detection request may include a resource obtaining request setting with a range field, where the range field is used to indicate that a byte in a set range in the to-be-transmitted resource is obtained.

In this way, the detecting and obtaining module 50 may include: a receiving unit, configured to receive a download request or an upload request from the physical client, and use the download request or the upload request as the resource obtaining request; and/or receive a request from the physical server, where the request requests the physical client to transmit data, and use the request as the resource obtaining request; and a sending unit, configured to send, according to the resource obtaining request received by the receiving unit a pre-detection request to a network element that stores the to-be-transmitted resource.

The attribute obtaining module 10 is configured to receive attribute information of the to-be-transmitted resource, where the attribute information of the to-be-transmitted resource is returned by the network element. According to different anti-virus policies and pre-detection requirements, the attribute information of the to-be-transmitted resource may include information such as a file size, a file type, a file name, and/or a file author.

The policy judging module 20 is configured to judge, based on an anti-virus policy and according to the attribute information, whether the to-be-transmitted resource needs anti-virus scanning.

According to a different judgment manner, the policy judging module 20 may have different structures. Preferably, the policy judging module 20 includes a local judging unit 21 and/or an external judging unit 22.

The local judging unit 21 is configured to judge, based on a locally stored anti-virus policy and according to the attribute information, whether the to-be-transmitted resource needs anti-virus scanning. That is, a judgment process after the pre-detection is implemented in the pre-classifier.

The external judging unit 22 is configured to send the attribute information to an external server to instruct the external server to judge, based on the anti-virus policy and according to the attribute information, whether the to-be-transmitted resource needs anti-virus scanning, and return a judgment result. In this manner, the pre-classifier obtains the judgment result returned by an external server with a judgment function.

In a practical application, one of the local judging unit 21 and the external judging unit 22 may exist, or both of them exist and work together, which may be set according to a requirement of the pre-detection.

According to different attribute information and anti-virus policies, the policy judging module 20 may perform different judgment operations, for example, may judge, according to the file size in the attribute information, whether a size of the to-be-transmitted resource is greater than a set threshold, to determine whether anti-virus scanning is needed; and/or, judge, according to the file type in the attribute information, whether a type of the to-be-transmitted resource belongs to a set type, to determine whether anti-virus scanning is needed.

Specifically, when the file size in the attribute information indicates that the size of the to-be-transmitted resource is greater than the set threshold, the policy judging module 20 determines that the to-be-transmitted resource needs anti-virus scanning; and when the file type in the attribute information indicates that the type of the to-be-transmitted resource belongs to the set type, the policy judging module 20 determines that the to-be-transmitted resource needs anti-virus scanning.

The scan initiating module 30 is configured to, if the policy judging module 20 judges that anti-virus scanning is needed, perform anti-virus scanning on the to-be-transmitted resource that is subsequently obtained.

Specifically, the to-be-transmitted resource that is subsequently obtained may be transmitted to a proxy layer for caching and anti-virus scanning, and may also be provided for another anti-virus server for anti-virus scanning, to obtain a scanning result. According to the scanning result, a virus-free file can be transmitted, and a file with a virus or another problem is discarded.

The transparent transmission initiating module 40 is configured to, if the policy judging module 20 judges that no anti-virus scanning is needed, transparently transmit the to-be-transmitted resource that is subsequently obtained.

This embodiment provides a technical solution to pre-detecting whether a to-be-transmitted resource needs anti-virus scanning. According to the technical solution in this embodiment, at a resource request obtaining stage, a pre-detection request is sent actively to obtain attribute information, and then the to-be-transmitted resource is pre-detected according to the attribute information; and a resource that needs no anti-virus scanning can be transmitted transparently and directly, thereby implementing an anti-virus function, improving transmission efficiency, and reducing the waste of cache, scanning and upper-layer transmission resources.

The foregoing technical solution is especially applicable to a typical scenario where a user initiates a resource obtaining request, and enhances anti-virus protection for a resource obtained by the user.

The pre-classifier provided in this embodiment may be set in a proxy gateway. Specifically, the pre-classifier may implement the proxy gateway anti-virus method provided in the embodiments of the present invention, has corresponding function modules, and can improve transmission efficiency of the proxy gateway and reduce resource waste.

An embodiment of the present invention further provides a proxy gateway, including a proxy client, a proxy server, and a virus-scanning and caching module. The virus-scanning and caching module may be disposed between the proxy client and the proxy server, and is configured to implement anti-virus scanning. The proxy gateway further includes a pre-classifier provided in any embodiment of the present invention. The pre-classifier is disposed in a lower layer of the proxy client and the proxy server. If a policy judging module judges that anti-virus scanning is needed, a to-be-transmitted resource that is obtained subsequently is provided through the proxy client or the proxy server for the virus-scanning and caching module for anti-virus scanning.

The proxy gateway provided in this embodiment can reduce a workload of the proxy layer and reduce resource waste, thereby speeding up data transmission of the proxy gateway.

It should be noted that, for brevity, the foregoing method embodiments are described as a series of actions. But persons skilled in the art should know that the present invention is not limited to the order of the described actions, because according to the present invention, some steps may be performed in other order or simultaneously. It should further be understood by persons skilled in the art that the described embodiments in the specification all belong to exemplary embodiments, and the involved actions and modules are not necessarily required in the present invention.

In the foregoing embodiments, descriptions of the embodiments have different emphases, and for parts that are not described in detail in one embodiment, reference may be made to the relevant description in other embodiments.

Persons of ordinary skill in the art should understand that all or a part of the steps in the method embodiments may be implemented by a program instructing relevant hardware. The program may be stored in a computer readable storage medium. When the program runs, the steps of the method embodiments are performed. The storage medium may be any medium that is capable of storing program codes, such as a ROM, a RAM, a magnetic disk, or an optical disk.

Finally, it should be noted that the foregoing embodiments are intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent replacements to some technical features in the technical solutions, as long as these modifications and replacements do not cause corresponding technical solutions to depart from the spirit and scope of the technical solutions of the embodiments of the present invention.

What is claimed is:

1. A proxy gateway anti-virus method executed by computer hardware, the method comprising:
   executing by the computer hardware:
   receiving a resource obtaining request;
   sending, according to the resource obtaining request, a pre-detection request to a network element that stores a to-be-transmitted resource, to obtain attribute information of the to-be-transmitted resource; and
   judging, based on an anti-virus policy and according to the attribute information, whether the to-be-transmitted resource needs anti-virus scanning; if yes, performing anti-virus scanning on the to-be-transmitted resource that is subsequently obtained; and if no, transparently transmitting the to-be-transmitted resource that is subsequently obtained.

2. The method according to claim 1, wherein:
   the receiving a resource obtaining request for obtaining a to-be-transmitted resource comprises:

receiving a download request or an upload request from a client and using the download request or the upload request as the resource obtaining request.

3. The method according to claim 1, wherein:
the judging, based on an anti-virus policy and according to the attribute information, whether the to-be-transmitted resource needs anti-virus scanning comprises:
judging, according to a file size in the attribute information, whether a size of the to-be-transmitted resource is greater than a set threshold, to determine whether anti-virus scanning is needed; and/or
judging, according to a file type in the attribute information, whether a type of the to-be-transmitted resource belongs to a set type, to determine whether anti-virus scanning is needed.

4. The method according to claim 1, wherein:
the performing anti-virus scanning on the to-be-transmitted resource that is subsequently obtained comprises:
transmitting the to-be-transmitted resource that is subsequently obtained to a proxy layer for caching and anti-virus scanning.

5. The method according to claim 1, wherein:
the judging, based on an anti-virus policy and according to the attribute information, whether the to-be-transmitted resource needs anti-virus scanning comprises:
judging, based on a locally stored anti-virus policy and according to the attribute information, whether the to-be-transmitted resource needs anti-virus scanning; or
sending the attribute information to an external server to instruct the external server to judge, based on the anti-virus policy and according to the attribute information, whether the to-be-transmitted resource needs anti-virus scanning, and return a judgment result.

6. The method according to claim 1, wherein:
the to-be-transmitted resource comprises a hypertext transfer protocol-based file, and the pre-detection request comprises a resource obtaining request setting with a range field, wherein the range field is used to indicate that a byte in a set range in the to-be-transmitted resource is obtained.

7. The method according to claim 1, wherein:
the attribute information of the to-be-transmitted resource comprises at least one of a file size, a file type, a file name, and a file author.

8. A computer hardware capable of implementing a pre-classifier in a proxy gateway device, the computer hardware comprising:
computing hardware to implement:
a detecting and obtaining module, configured to receive a resource obtaining request, and send, according to the resource obtaining request, a pre-detection request to a network element that stores the to-be-transmitted resource;
an attribute obtaining module, configured to receive attribute information of the to-be-transmitted resource, wherein the attribute information of the to-be-transmitted resource is returned by the network element according to the pre-detection request;
a policy judging module, configured to judge, based on an anti-virus policy and according to the attribute information, whether the to-be-transmitted resource needs anti-virus scanning;
a scan initiating module, configured to, if the policy judging module judges that anti-virus scanning is needed, perform anti-virus scanning on the to-be-transmitted resource that is subsequently obtained; and
a transparent transmission initiating module, configured to, if the policy judging module judges that anti-virus scanning is not needed, transparently transmit the to-be-transmitted resource that is subsequently obtained.

9. The computer hardware implemented pre-classifier according to claim 8, wherein the policy judging module comprises:
a local judging unit, configured to judge, based on a locally stored anti-virus policy and according to the attribute information, whether the to-be-transmitted resource needs anti-virus scanning; and/or
an external judging unit, configured to send the attribute information to an external server to instruct the external server to judge, based on the anti-virus policy and according to the attribute information, whether the to-be-transmitted resource needs anti-virus scanning, and return a judgment result.

10. A proxy gateway device implemented by computer hardware, comprising a proxy client, a proxy server, and a virus-scanning and caching module, wherein:
the proxy gateway device further comprises the computer hardware implemented pre-classifier according to claim 8, and the computer hardware implemented pre-classifier function disposed in a lower layer of the proxy client and the proxy server.

11. The method according to claim 2, wherein:
the judging, based on an anti-virus policy and according to the attribute information, whether the to-be-transmitted resource needs anti-virus scanning comprises:
judging, according to a file size in the attribute information, whether a size of the to-be-transmitted resource is greater than a set threshold, to determine whether anti-virus scanning is needed; and/or
judging, according to a file type in the attribute information, whether a type of the to-be-transmitted resource belongs to a set type, to determine whether anti-virus scanning is needed.

12. The method according to claim 2, wherein:
the performing anti-virus scanning on the to-be-transmitted resource that is subsequently obtained comprises:
transmitting the to-be-transmitted resource that is subsequently obtained to a proxy layer for caching and anti-virus scanning.

13. The method according to claim 2, wherein:
the judging, based on an anti-virus policy and according to the attribute information, whether the to-be-transmitted resource needs anti-virus scanning comprises:
judging, based on a locally stored anti-virus policy and according to the attribute information, whether the to-be-transmitted resource needs anti-virus scanning; or
sending the attribute information to an external server to instruct the external server to judge, based on the anti-virus policy and according to the attribute information, whether the to-be-transmitted resource needs anti-virus scanning, and return a judgment result.

14. The method according to claim 2, wherein:
the to-be-transmitted resource comprises a hypertext transfer protocol-based file, and the pre-detection request comprises a resource obtaining request setting with a range field, wherein the range field is used to indicate that a byte in a set range in the to-be-transmitted resource is obtained.

15. The method according to claim 2, wherein:
the attribute information of the to-be-transmitted resource comprises at least one of a file size, a file type, a file name, and a file author.

* * * * *